US012187581B2

(12) United States Patent
Funai

(10) Patent No.: US 12,187,581 B2
(45) Date of Patent: Jan. 7, 2025

(54) GUIDE RAIL DEVICE FOR ELEVATOR

(71) Applicant: Mitsubishi Electric Building Solutions Corporation, Tokyo (JP)

(72) Inventor: Nobuhito Funai, Tokyo (JP)

(73) Assignee: MITSUBISHI ELECTRIC BUILDING SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 18/387,869

(22) Filed: Nov. 8, 2023

(65) Prior Publication Data

US 2024/0317544 A1 Sep. 26, 2024

(30) Foreign Application Priority Data

Mar. 24, 2023 (JP) ................................ 2023-047924

(51) Int. Cl.
*B66B 7/02* (2006.01)

(52) U.S. Cl.
CPC .............. *B66B 7/024* (2013.01); *B66B 7/026* (2013.01)

(58) Field of Classification Search
CPC ........ B66B 7/024; B66B 7/02; B66B 11/0273
See application file for complete search history.

(56) References Cited

U.S. PATENT DOCUMENTS

| | | | | | |
|---|---|---|---|---|---|
| 559,539 | A * | 5/1896 | Reynolds | B66B 7/024 187/408 |
| 4,431,087 | A * | 2/1984 | Karol | B66B 7/02 238/337 |
| 4,577,729 | A * | 3/1986 | Karol | B66B 7/02 187/408 |
| 6,305,615 | B1 * | 10/2001 | Traktovenko | B66B 7/024 187/408 |
| 6,371,249 | B1 * | 4/2002 | Schops | B66B 7/024 187/408 |
| 10,882,718 | B2 * | 1/2021 | Funai | B66B 7/02 |
| 2004/0216963 | A1 * | 11/2004 | Kurzo | B66B 7/02 187/408 |
| 2007/0170013 | A1 * | 7/2007 | Rivera | B66B 7/024 187/408 |

(Continued)

FOREIGN PATENT DOCUMENTS

| | | | | |
|---|---|---|---|---|
| CN | 112239116 A | | 1/2021 | |
| JP | 2018-188240 A | | 11/2018 | |
| WO | WO-2023036397 A1 | * | 3/2023 | B66B 11/0045 |

OTHER PUBLICATIONS

Action issued Aug. 12, 2024 in Taiwanese Patent Application No. 112142869, 8 pages.

*Primary Examiner* — Michael A Riegelman
(74) *Attorney, Agent, or Firm* — XSENSUS LLP

(57) ABSTRACT

Provided is a guide rail device for an elevator, which includes a plurality of fixing bodies. Among the plurality of fixing bodies, a fixing body that is the closest to a fishplate is referred to as a first fixing body, and a fixing body that is the second closest to the fishplate is referred to as a second fixing body. Further, a distance between a position of the first fixing body and a position of the second fixing body in a vertical direction is referred to as a rail fixing distance. In this case, a distance from the position of the first fixing body to a position of the fishplate in the vertical direction is one-third or less of the rail fixing distance.

5 Claims, 6 Drawing Sheets

(56) References Cited

U.S. PATENT DOCUMENTS

2013/0056310 A1* 3/2013 Bjorni ........................ B66B 7/02
187/408
2018/0251341 A1* 9/2018 Funai ...................... B66B 7/024
2018/0297815 A1* 10/2018 Kirsch .................. B66B 19/002
2018/0354750 A1* 12/2018 Fonteneau ................ B66B 7/02
2018/0362299 A1* 12/2018 Polinski .................. B66B 7/024
2018/0370766 A1* 12/2018 Madureira De Almeida ..............
B66B 7/024
2019/0023533 A1* 1/2019 Kalynytschenko ..... B66B 7/024
2019/0367327 A1* 12/2019 Kallio ..................... B66B 7/024
2020/0031622 A1* 1/2020 Ferri ....................... B66B 7/024
2020/0115190 A1* 4/2020 Xiong ..................... B66B 7/024
2021/0238011 A1* 8/2021 Haag ....................... B66B 7/024
2022/0144593 A1* 5/2022 Maruyama ............ B66B 19/002

* cited by examiner

GUIDE RAIL DEVICE FOR ELEVATOR

CROSS-REFERENCE TO RELATED APPLICATION

This patent application claims priority from Japanese Patent Application No. 2023-047924, filed on Mar. 24, 2023, the entire disclosure of which is hereby incorporated by reference herein.

BACKGROUND OF THE INVENTION

1. Field of the Invention

This disclosure relates to a guide rail device for an elevator.

2. Description of the Related Art

In a related-art elevator, a guide rail includes a plurality of unit rails. Two unit rails that are adjacent to each other in an up-and-down direction are coupled by a fishplate. Further, the guide rail is fixed to a wall of a hoistway through intermediation of a plurality of rail brackets (see, for example, Japanese Patent Application Laid-open No. 2018-188240).

In the related-art elevator described above, when the hoistway has a rigid structure such as a reinforced concrete structure or a steel-framed reinforced concrete structure, the rail brackets can be installed at any suitable positions in a vertical direction. Thus, for example, when each of the unit rails has a length of 5 m and is fixed at two positions on the wall of the hoistway, the unit rail is fixed onto the wall of the hoistway at a position 500 mm away from an end portion of the unit rail and a position 2,500 mm away from the position described above. In this case, the fishplate is installed at a position 500 mm away from the rail bracket, where generated moment is relatively small.

Meanwhile, when the hoistway has a flexible structure, that is, a steel-framed structure, the positions at which the rail brackets are installed are limited to positions on building beams immediately below each floor. Thus, when a standard-length rail such as a 5-meter rail is used as a unit rail, the fishplate may be installed at a position where maximum moment is generated, that is, at an intermediate position between two rail brackets. In addition, a dimension between floors may be as large as about 4,000 mm in some cases. In such cases, a distance between the rail brackets is also large, thus resulting in significantly large maximum moment. Thus, the use of special bolts or a special surface treatment on each of joint surfaces of the unit rails and the fishplate is required to frictionally join the fishplate to the unit rails to be coupled together.

SUMMARY OF THE INVENTION

This disclosure has been made to solve the problem described above, and has an object to provide a guide rail device for an elevator, which is capable of suppressing moment acting on a fishplate even when a hoistway has a flexible structure.

According to one embodiment of this disclosure, there is provided a guide rail device for an elevator, including: a guide rail main body that is installed in a hoistway, includes a plurality of rail members joined together in an up-and-down direction, and is configured to guide vertical movement of a vertically movable body; a fishplate configured to couple two of the plurality of rail members, the two rail members being adjacent to each other in the up-and-down direction; and a plurality of fixing bodies configured to fix the guide rail main body to a building. The hoistway has a flexible structure. When a fixing body that is the closest to the fishplate among the plurality of fixing bodies is referred to as a first fixing body, a fixing body that is the second closest to the fishplate is referred to as a second fixing body, and a distance between a position of the first fixing body and a position of the second fixing body in a vertical direction is referred to as a rail fixing distance, a distance from the position of the first fixing body to a position of the fishplate in the vertical direction is one-third or less of the rail fixing distance.

According to the guide rail device for an elevator of this disclosure, it is possible to suppress moment acting on the fishplate when the hoistway has the flexible structure.

DESCRIPTION OF THE EMBODIMENTS

Now, an embodiment is described with reference to the drawings.

First Embodiment

Figure 1:
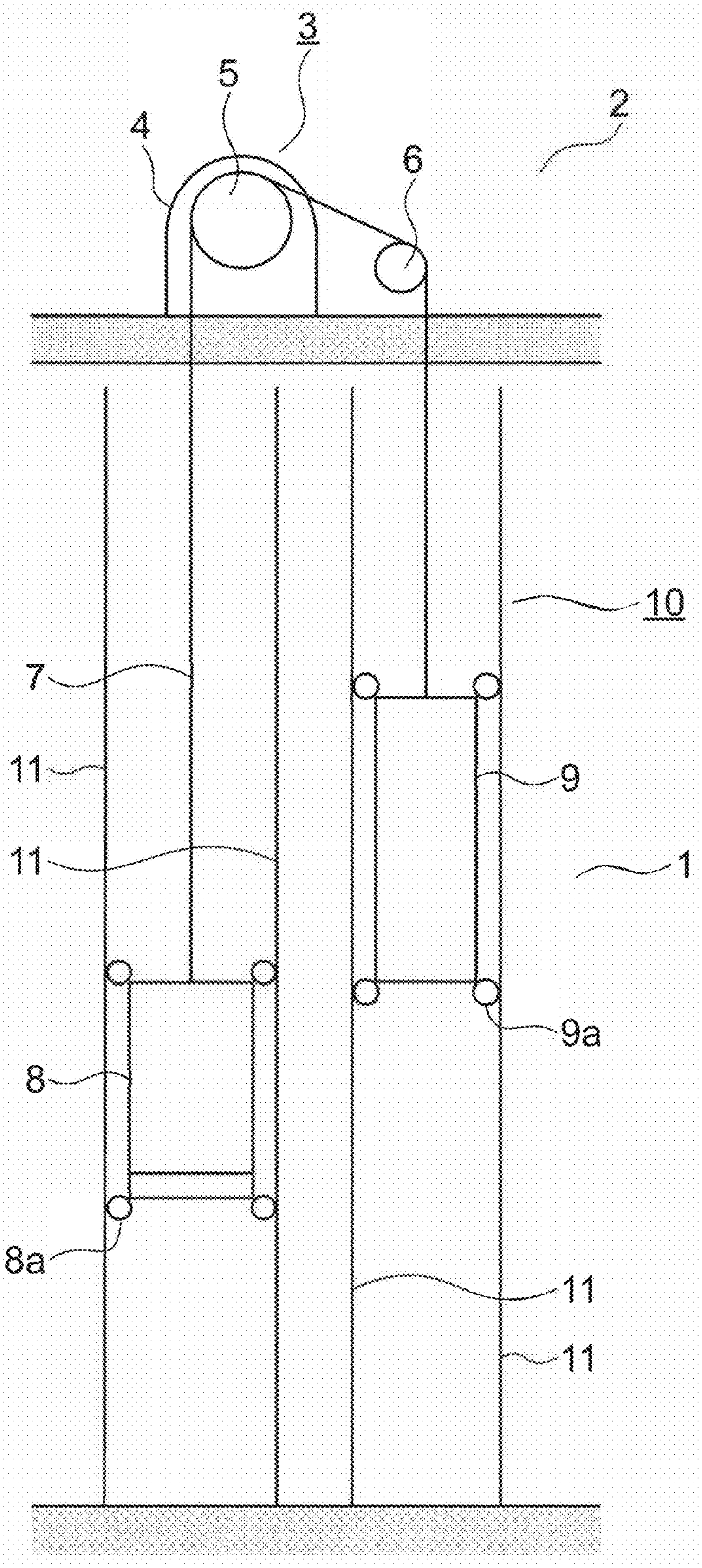
FIG. 1 is a schematic configuration view for illustrating an elevator according to a first embodiment.

FIG. 1 is a schematic configuration view for illustrating an elevator according to a first embodiment. In FIG. 1, a machine room 2 is provided in an upper part of a hoistway 1. An elevator hoisting machine 3 and a deflector sheave 6 are installed in the machine room 2.

The elevator hoisting machine 3 includes a hoisting machine main body 4 and a driving sheave 5. The hoisting machine main body 4 includes a hoisting machine motor and a hoisting machine brake. The hoisting machine motor rotates the driving sheave 5. The hoisting machine brake holds the driving sheave 5 in a stationary state. Further, the hoisting machine brake brakes rotation of the driving sheave 5.

Suspension bodies 7 are wound around the driving sheave 5 and the deflector sheave 6. A plurality of ropes or a plurality of belts are used as the suspension bodies 7. A car 8 serving as a vertically movable body is connected to a first end portion of the suspension bodies 7. A counterweight 9 serving as a vertically movable body is connected to a second end portion of the suspension bodies 7.

The car 8 and the counterweight 9 are suspended by the suspension bodies 7 in the hoistway 1. Further, the car 8 and the counterweight 9 are vertically moved in the hoistway 1 through rotation of the driving sheave 5.

A guide rail device 10 is provided in the hoistway 1. The guide rail device 10 includes a plurality of guide rail main bodies 11. The plurality of guide rail main bodies 11 include a pair of car guide rail main bodies and a pair of counterweight guide rail main bodies.

The pair of car guide rail main bodies are configured to guide vertical movement of the car 8. The pair of counterweight guide rail main bodies are configured to guide vertical movement of the counterweight 9.

A plurality of car guide shoes 8*a* are provided to the car 8. When the car 8 is vertically moved, each of the car guide shoes 8*a* is moved in contact with a corresponding one of the car guide rail main bodies.

A plurality of counterweight guide shoes 9*a* are provided to the counterweight 9. When the counterweight 9 is vertically moved, each of the counterweight guide shoes 9*a* is moved in contact with a corresponding one of the counterweight guide rail main bodies.

Figure 2:
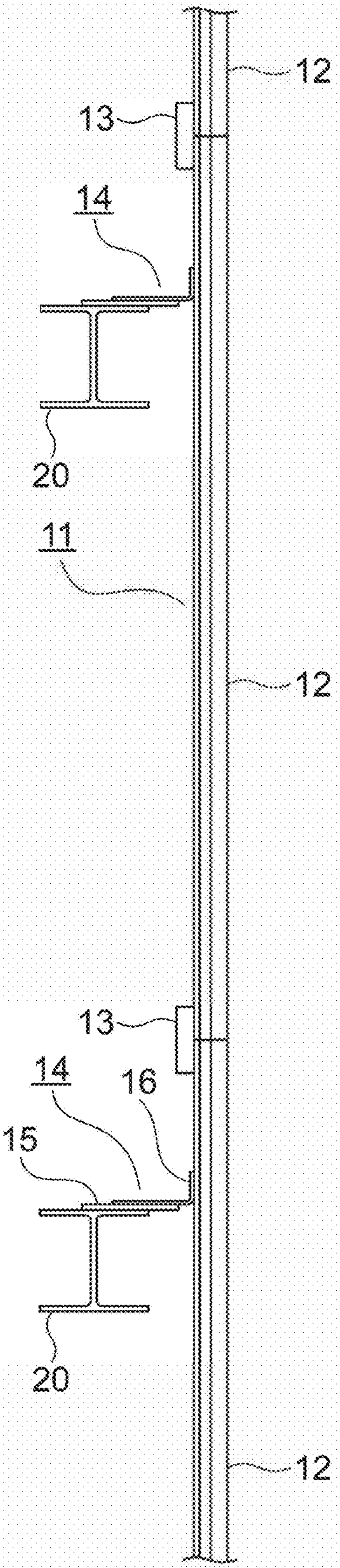
FIG. 2 is a partially enlarged side view of a guide rail main body of FIG. 1.
Figure 3:
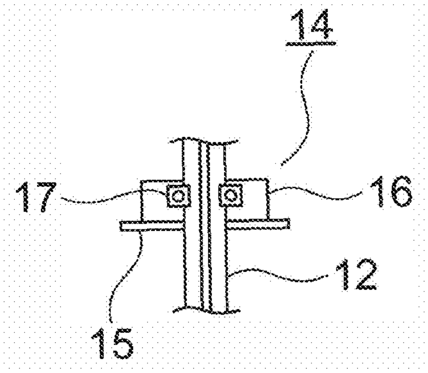
FIG. 3 is a front view for illustrating a main part of FIG. 2.

FIG. 2 is a partially enlarged side view of the guide rail main body 11 of FIG. 1. FIG. 3 is a front view for illustrating a main part of FIG. 2. Each of the guide rail main bodies 11 includes a plurality of rail members 12 that are joined together in an up-and-down direction.

Although not shown in FIG. 1, the guide rail device 10 further includes a plurality of fishplates 13 and a plurality of fixing bodies 14 in addition to the plurality of guide rail main bodies 11.

Each of the fishplates 13 couples two of the plurality of rail members 12, which are adjacent to each other in the up-and-down direction. Each of the fishplates 13 is fixed to two rail members 12 by a plurality of bolts (not shown).

The fixing bodies 14 fix the guide rail main body 11 to a building. Specifically, each of the guide rail main bodies 11 is installed in the hoistway 1 through intermediation of the plurality of fixing bodies 14.

The hoistway 1 according to the first embodiment has a flexible structure. Thus, each of the fixing bodies 14 is fixed to a corresponding one of building beams 20.

Each of the fixing bodies 14 includes a base plate 15, a rail bracket 16, and a pair of rail clips 17.

The base plate 15 is fixed to the building beam 20 by, for example, welding. The rail bracket 16 is fixed to the base plate 15 by, for example, welding.

The guide rail main body 11 is sandwiched between the pair of rail clips 17 and the rail bracket 16 in each of the fixing bodies 14. Specifically, the guide rail main body 11 is fixed to the rail bracket 16 by the pair of rail clips 17 in each of the fixing bodies 14.

Figure 4:
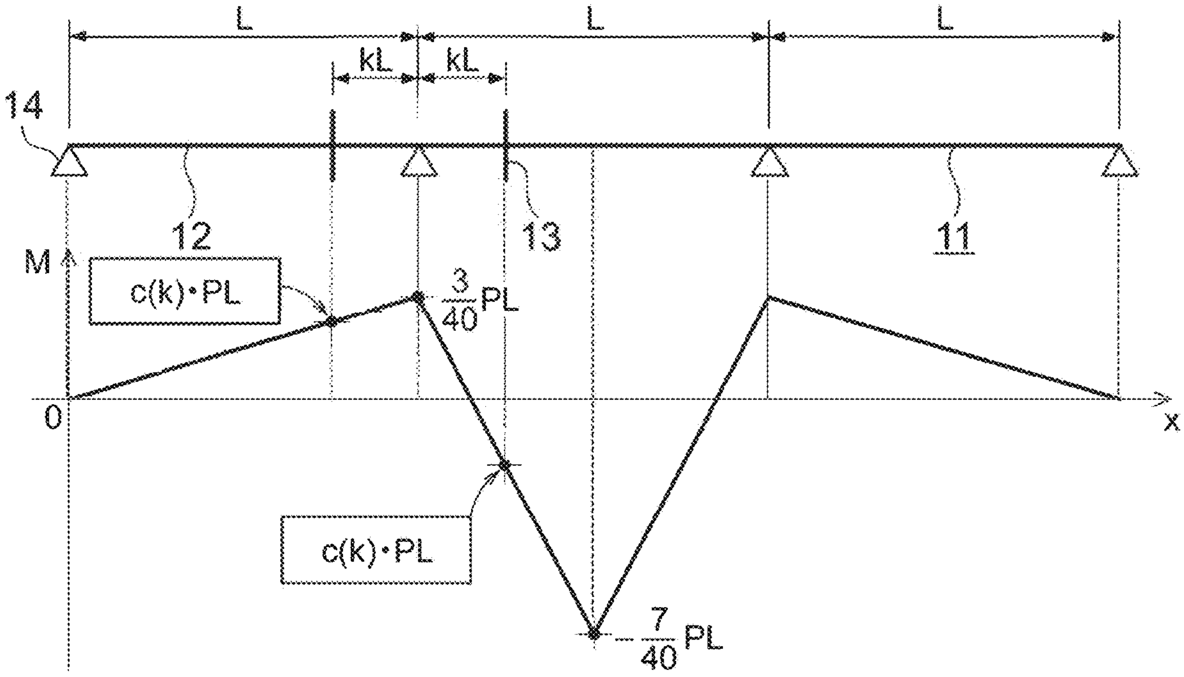
FIG. 4 is an explanatory view for illustrating moment that is generated in a guide rail device according to the first embodiment.

FIG. 4 is an explanatory view for illustrating moment generated in the guide rail device 10 according to the first embodiment. In FIG. 4, a model of the guide rail device 10 is illustrated in an upper part, and moment is illustrated in a lower part. Further, a right-and-left direction in FIG. 4 corresponds to a vertical direction.

In the model of the guide rail device 10, the guide rail main body 11 is represented by a straight line. Further, a position of each of the fishplates 13, that is, a boundary between two adjacent rail members 12 is represented by a straight line that is orthogonal to the guide rail main body 11. Further, a position of each of the fixing bodies 14, that is, a position at which the guide rail main body 11 is fixed by each of the fixing bodies 14 is represented by a triangle.

In the lower part of FIG. 4, there is illustrated a magnitude of moment generated when an external force of a magnitude P acts on a center of the guide rail main body 11 in the vertical direction. Further, a horizontal axis represents a position "x" in the vertical direction, and a vertical axis represent a magnitude M of moment.

In this case, when one of the plurality of fishplates 13 is set as a target fishplate, the fixing body 14 that is the closest to the target fishplate is referred to as "first fixing body" and the fixing body 14 that is the second closest to the target fishplate is referred to as "second fixing body". Further, a distance between a position of the first fixing body and a position of the second fixing body in the vertical direction is referred to as "rail fixing distance L".

Further, a distance from the position of the first fixing body to the target fishplate is represented by "a". Further, a ratio of the distance "a" to the rail fixing distance L is referred to as "fishplate position ratio "k"". Specifically, $k=a/L$ is satisfied.

In this case, the magnitude M of moment can be expressed as: $M=C(k)\times PL$. In this expression, a coefficient C (k) is a function of "k" and is a dimensionless number. The value PL is uniquely determined by specifications of the elevator, and thus PL cannot be made smaller. However, when the coefficient C (k) is decreased as much as possible, the magnitude M of moment can be reduced.

Figure 5:
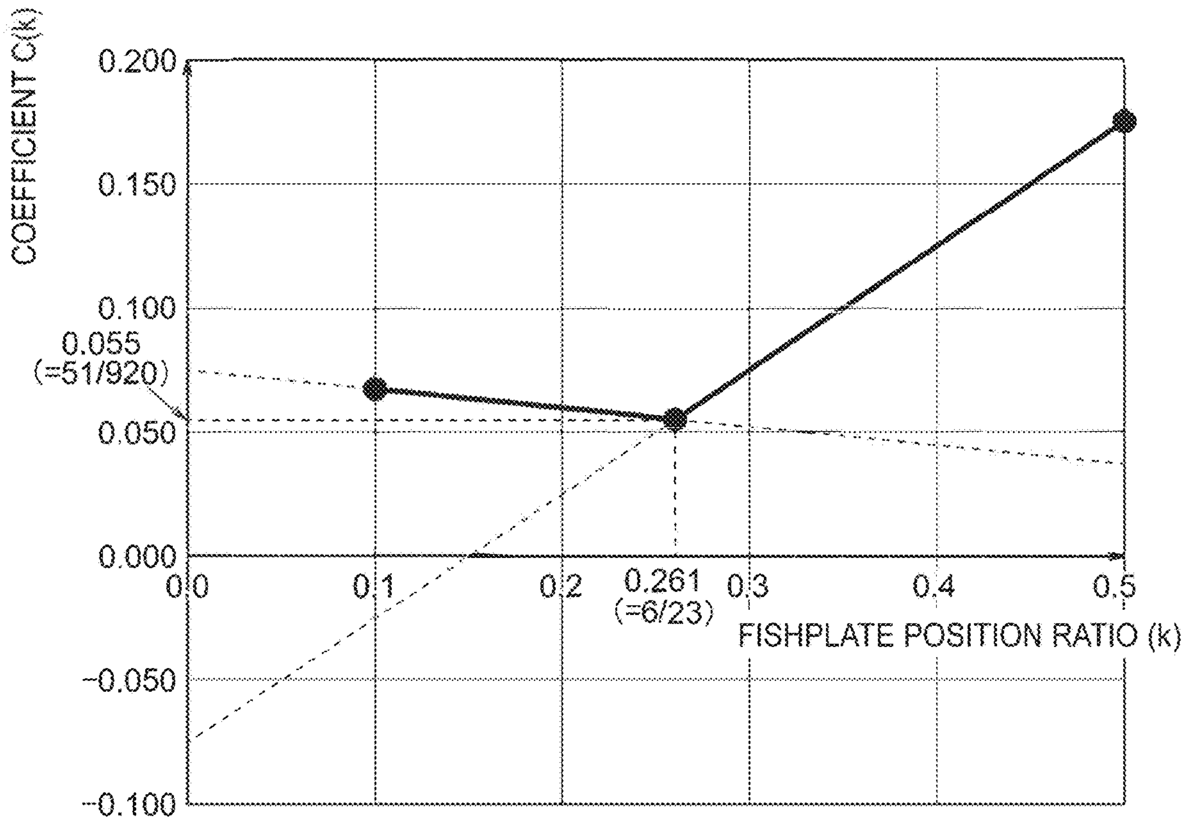
FIG. 5 is a graph for showing a relationship between a fishplate position ratio “k” and a coefficient C(k).

A domain of definition of the fishplate position ratio "k" is expressed as: $0.1\leq k\leq 0.5$. Thus, when the coefficient C(k) is graphed, FIG. 5 is obtained. It is understood from FIG. 5 that, when the fishplate position ratio "k"$\approx$¼=0.25 is satisfied, the coefficient C(k) is minimized.

Figure 6:
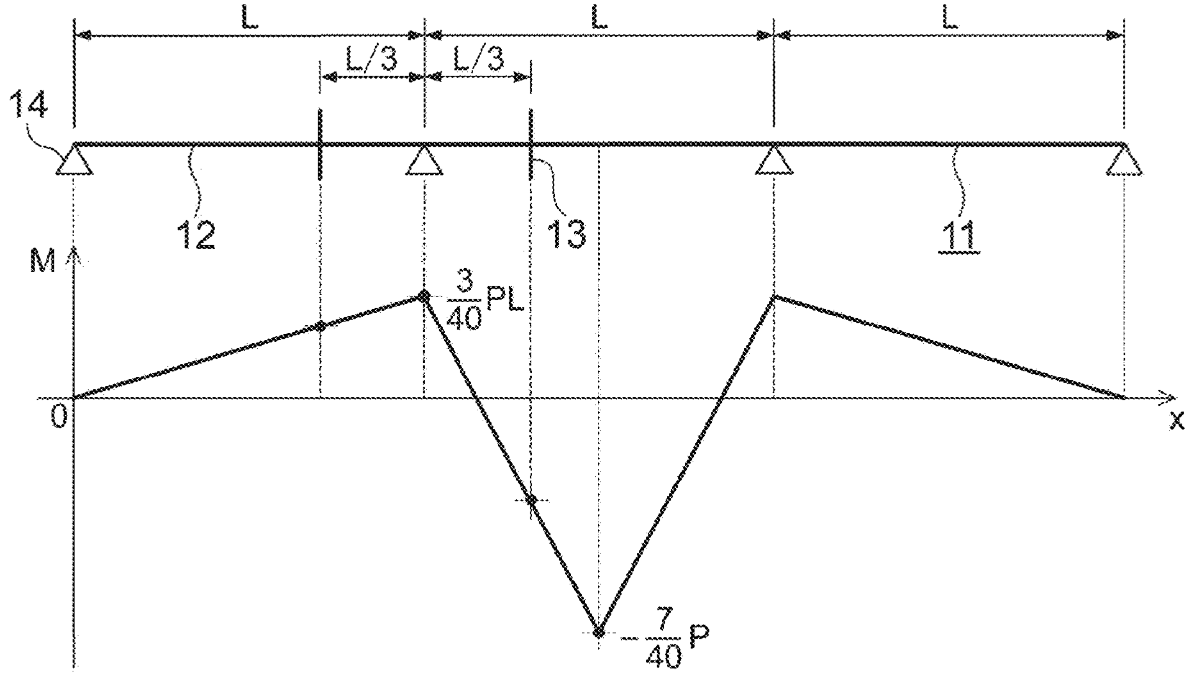
FIG. 6 is an explanatory view for illustrating a suitable range of a position of a fishplate in the first embodiment.

When the fishplate position ratio "k" is set to ¼ for every rail fixing distance L, for example, working efficiency in installation of the guide rail main body 11 and a degree of freedom in length of the rail member 12 are undermined. Thus, in view of practical aspects, it is suitable to set the fishplate position ratio "k" so as to satisfy: $k\leq 1/3$, as illustrated in FIG. 6.

As described above, in the guide rail device 10 according to the first embodiment, the distance from the position of the first fixing body to the position of the target fishplate in the vertical direction is set to one-third or less of the rail fixing distance L. In other words, the length of each of the rail members 12 is set so as to satisfy: fishplate position ratio "k"$\leq 1/3$.

Thus, even when the hoistway 1 has a flexible structure, moment acting on each of the fishplates 13 can be suppressed. As a result, a shift of each of the fishplates 13, which may be caused by an external force, can be suppressed, and riding comfort performance of the elevator can be maintained.

Further, the use of special bolts or a special surface treatment on each of joint surfaces of the rail members 12 and the fishplate 13 is not required to frictionally join the fish plate 13 to the rail members 12. Accordingly, material cost, manufacture cost, and installation cost can be reduced.

Further, when the distance from the position of the first fixing body to the position of the target fishplate in the vertical direction is set to one-quarter of the rail fixing distance L, the moment acting on each of the fishplates 13 can be more reliably suppressed.

The number of fishplates 13 and the number of fixing bodies 14 for each of the guide rail main bodies 11 can be suitably changed depending on an elevator.

Further, the type of elevator is not limited to that illustrated in FIG. 1. For example, a 2:1 roping elevator may be used.

Further, the elevator may be, for example, a machine room-less elevator, a double-deck elevator, and a one-shaft multi-car system elevator. The one-shaft multi-car system is a system in which an upper car and a lower car arranged directly below the upper car are vertically moved in the common hoistway independently.

What is claimed is:

1. A guide rail device for an elevator, comprising:

a guide rail main body that is installed in a hoistway, includes a plurality of rail members joined together in an up-and-down direction, and is configured to guide vertical movement of a vertically movable body;

a fishplate configured to couple two of the plurality of rail members, the two rail members being adjacent to each other in the up-and-down direction; and a plurality of fixing bodies configured to fix the guide rail main body to a building, wherein the hoistway has a flexible structure, and wherein, when a fixing body that is the closest to the fishplate among the plurality of fixing bodies is referred to as a first fixing body, a fixing body that is the second closest to the fishplate is referred to as a second fixing body, and a distance between a position of the first fixing body and a position of the second fixing body in a vertical direction is referred to as a rail fixing distance, a distance from the position of the first fixing body to a position of the fishplate in the vertical direction is one-third or less of the rail fixing distance.

2. The guide rail device for an elevator according to claim 1, wherein the distance from the position of the first fixing body to the position of the fishplate in the vertical direction is one-quarter of the rail fixing distance.

3. A guide rail device for an elevator, comprising:

a guide rail main body including a plurality of rails joined together in an up-and-down direction, the guide rail main body to guide vertical movement of a vertically movable body;

a fishplate coupling two of the plurality of rails, the two rails being adjacent to each other in the up-and-down direction; and a plurality of fixing bodies to fix the guide rail main body to a building, the plurality of fixing bodies including a first fixing body that is the closest to the fishplate among the plurality of fixing bodies, and a second fixing body that is a second closest fixing body to the fishplate, wherein a distance from a position of the first fixing body to a position of the fishplate in the vertical direction is one-third or less of a rail fixing distance which is a distance between a position of the first fixing body and a position of the second fixing body in a vertical direction.

4. The guide rail device for an elevator according to claim 3, wherein:

the distance from the position of the first fixing body to the position of the fishplate in the vertical direction is one-quarter of the rail fixing distance.

5. The guide rail device for an elevator according to claim 3, wherein:

the distance from the position of the first fixing body to the position of the fishplate in the vertical direction is one-quarter or less of the rail fixing distance.

* * * * *